Sept. 22, 1931.  A. JUNEAU  1,824,670
AXLE DRIVE MECHANISM
Filed March 30, 1929  4 Sheets-Sheet 1
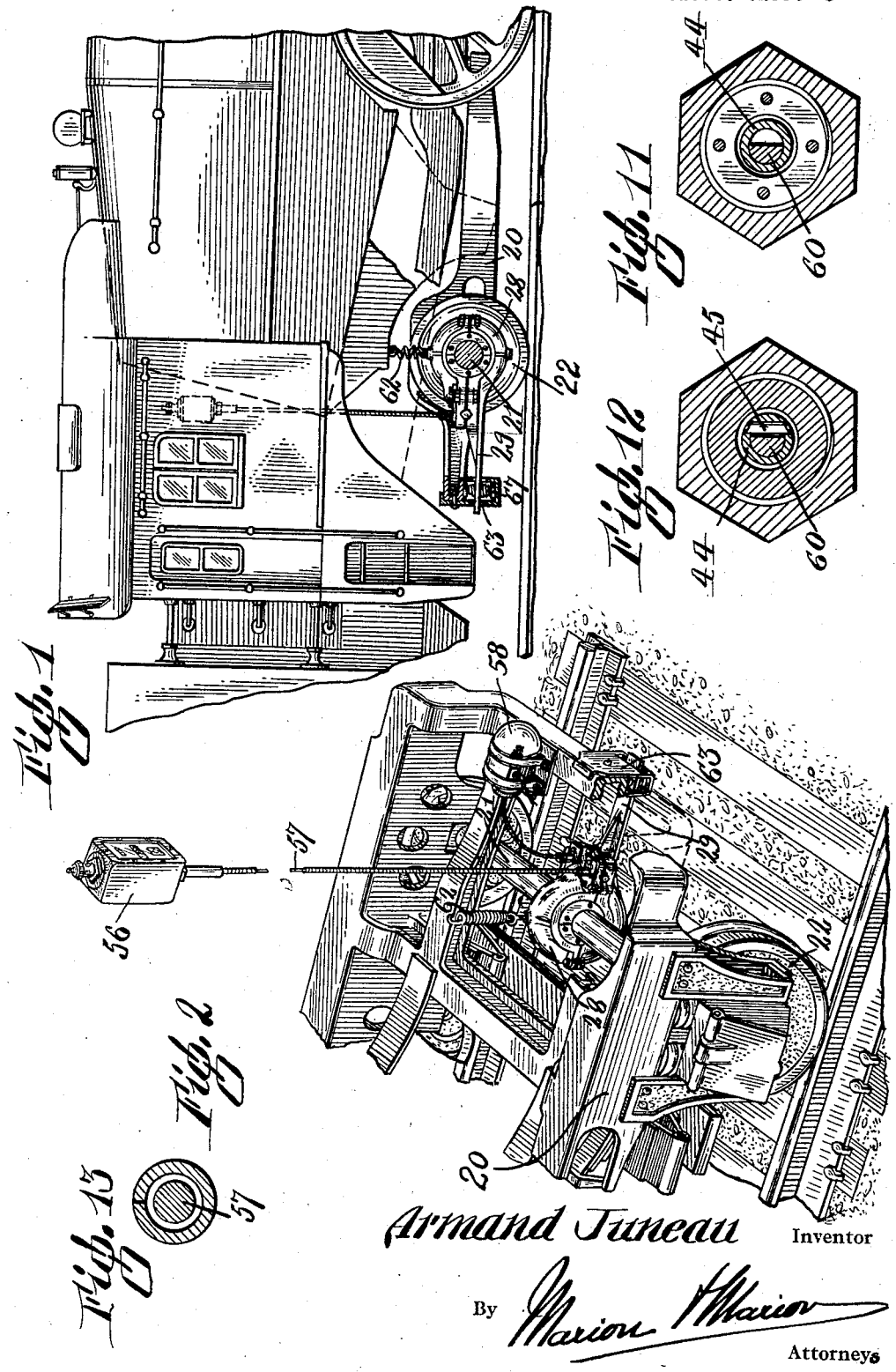
Armand Juneau Inventor
By Marion & Marion
Attorneys

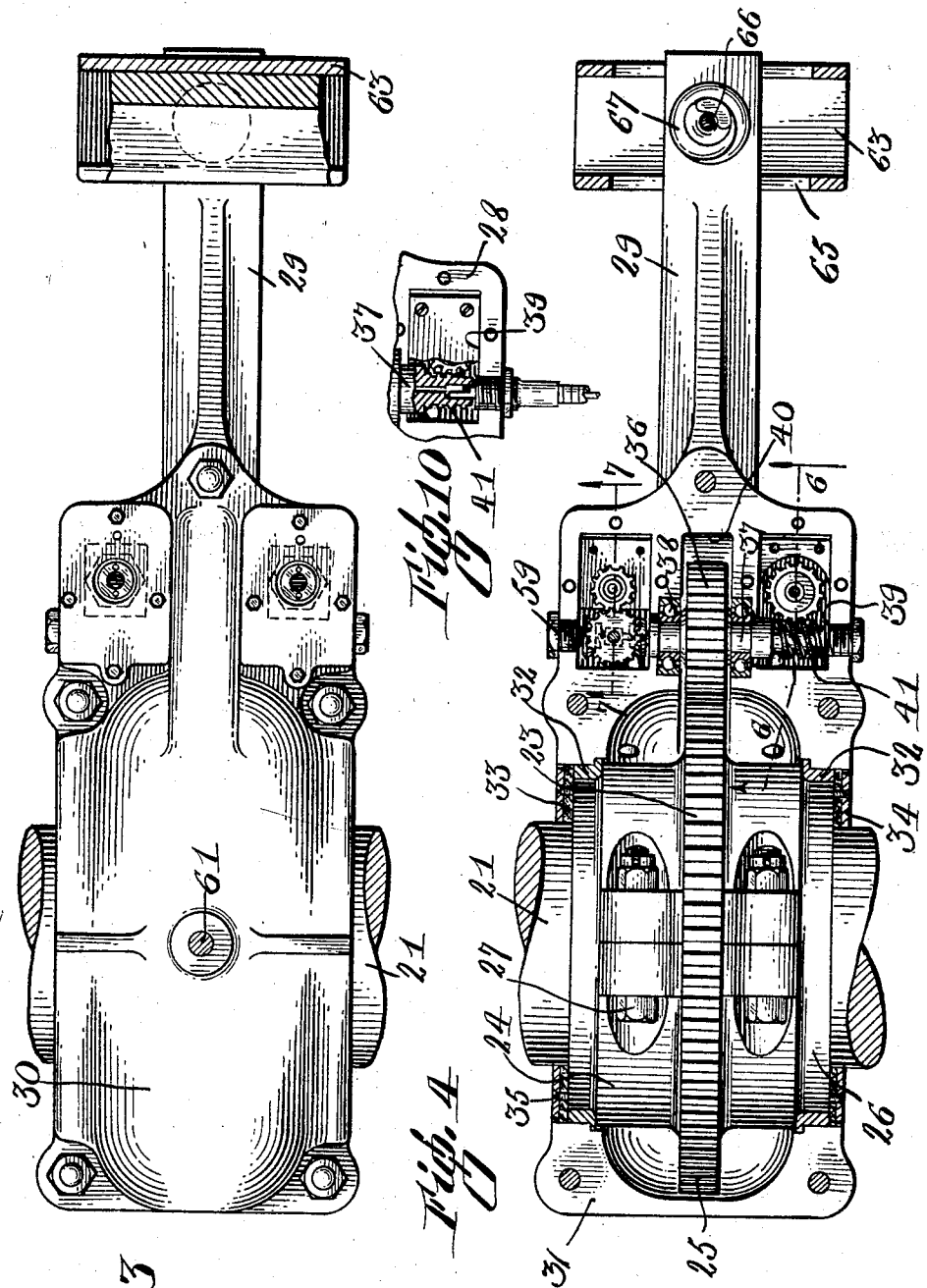

Sept. 22, 1931. A. JUNEAU 1,824,670
AXLE DRIVE MECHANISM
Filed March 30, 1929 4 Sheets-Sheet 3
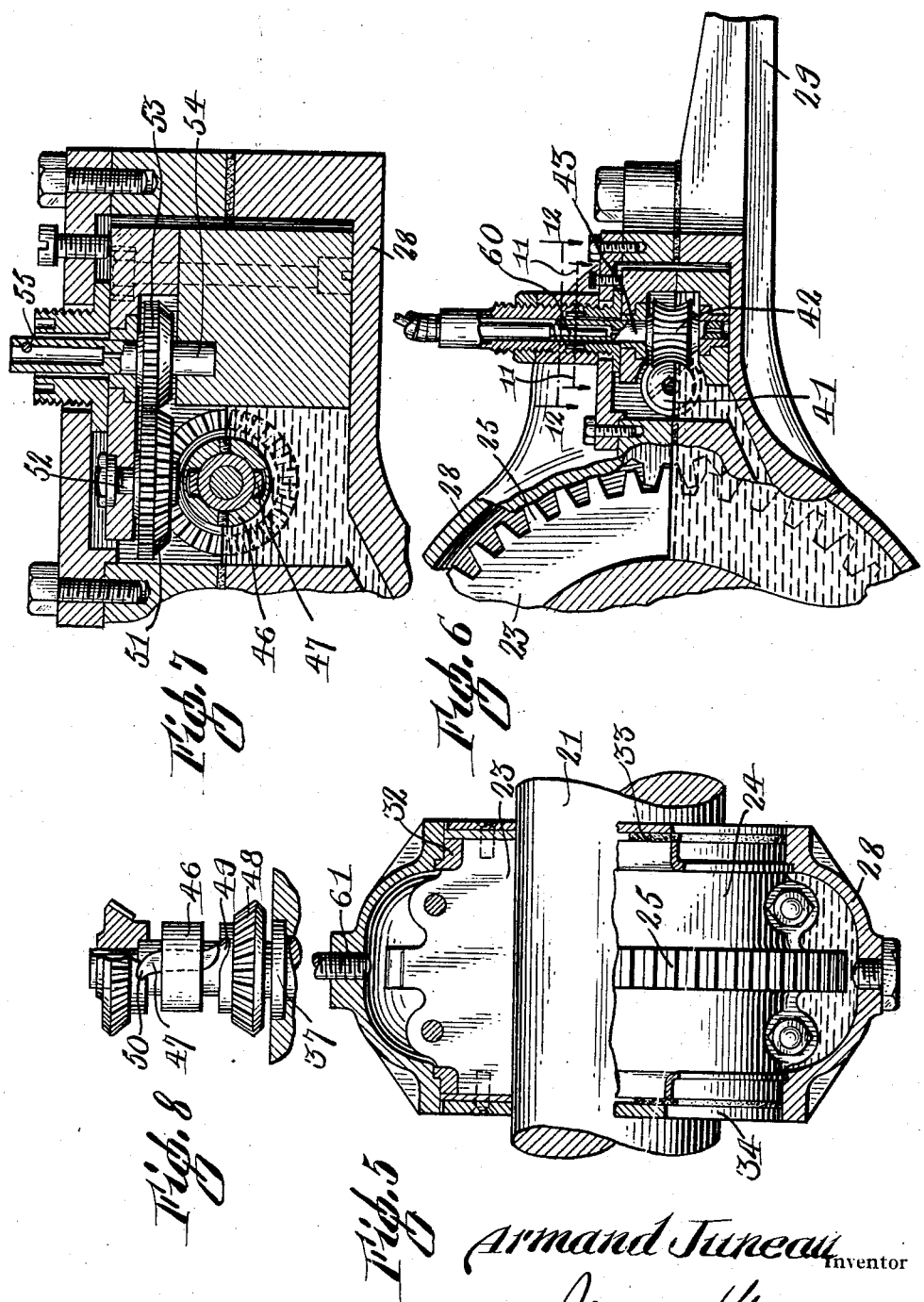

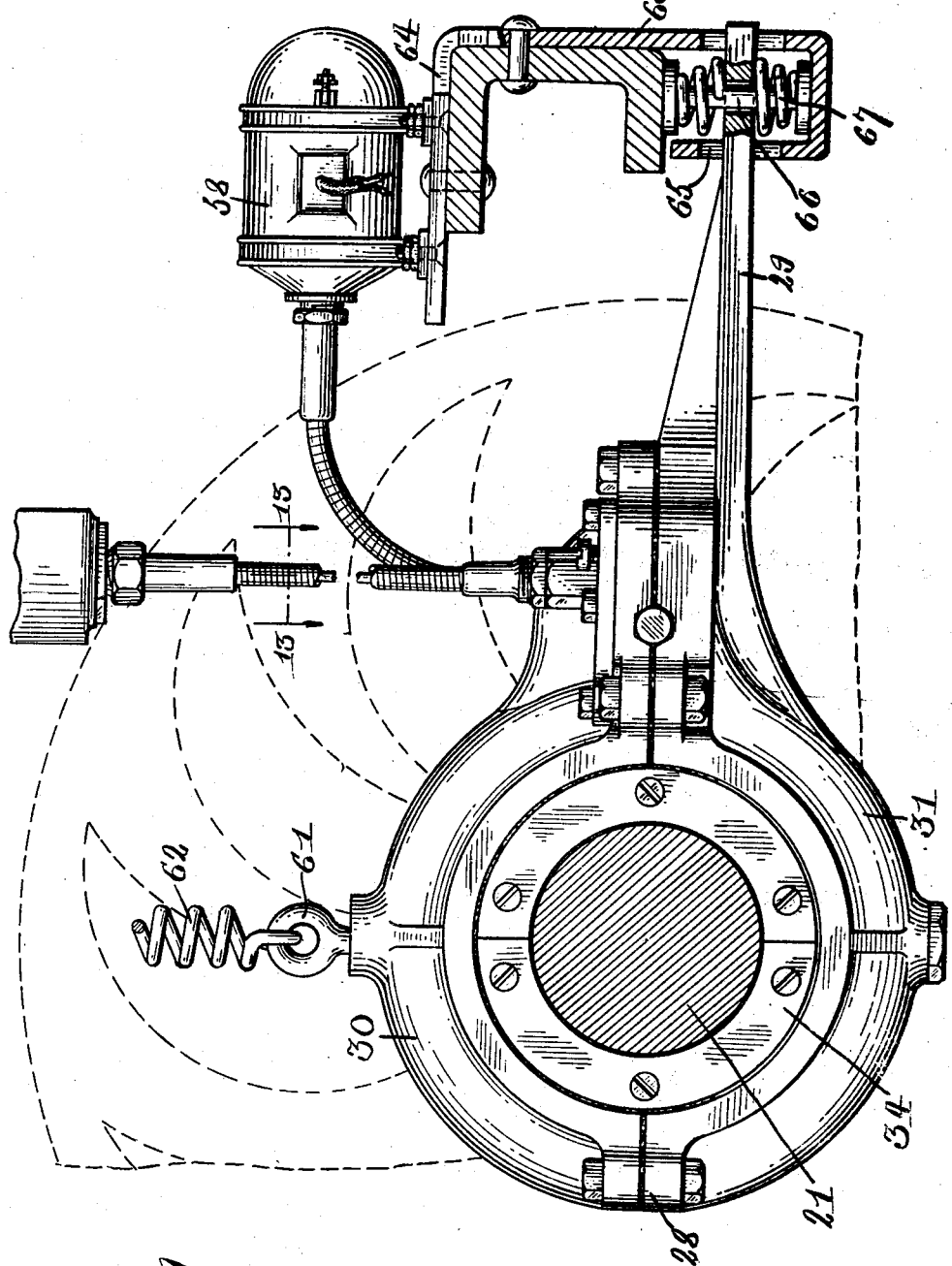

Patented Sept. 22, 1931

1,824,670

UNITED STATES PATENT OFFICE

ARMAND JUNEAU, OF MONTREAL, QUEBEC, CANADA

AXLE DRIVE MECHANISM

Application filed March 30, 1929. Serial No. 351,292.

The present invention relates to improvements in axle drive mechanism especially adapted for the operation of auxiliary equipments in railways from the rotary car axle.

Heretofore, it has been the common practice to operate speedometers and other auxiliary equipment of railway locomotives by means of a belt drive. This has proven defective in that slippage and breakage of the drive belt often occurs, rendering operation of the driven auxiliary mechanism inaccurate. This common form of driving structure has evidently been employed in the absence of a positive gear transmission suitably perfected to perform this duty.

An important object of the present invention is the provision of a positive gear drive designed to provide an efficient axle transmission for the operation of speedometers, generators, dynamometer instruments and similar auxiliary mechanism.

A further object of the invention is the provision of drive mechanism of compact construction designed to operate a plurality of auxiliary mechanisms.

A still further object of the invention is the provision of drive mechanism of the above character which will be mounted so as to reduce vibration and shock to a minimum and to constantly and accurately drive the auxiliary equipments connected therewith and not affected by the various movements of the truck frame and axle.

Another object of the invention is the provision of an axle drive construction formed for continuous and proper lubrication to insure reliable operation.

Still another object of the invention is the provision of an axle drive transmission particularly adapted for the operation of the speedometer constructed in accordance with my co-pending application filed November 22, 1928, Serial Number 321,112.

Other objects and advantages of the invention will become apparent as the description progresses.

In the accompanying drawings forming a part of this specification and in which like reference characters are employed to designate corresponding parts throughout the same:

Figure 1 is a fragmentary side elevational view of a locomotive illustrating the connection of the drive mechanism in association therewith, Figure 2 is a fragmentary perspective view of a railway standard coach truck illustrating the position of the drive mechanism thereon.

Figure 3 is a top plan view of the assembled drive mechanism,

Figure 4 is a similar view with the top section of the housing removed,

Figure 5 is a transverse sectional view through the main drive gear and housing, Figure 6 is a fragmentary longitudinal section taken on the line 6—6 of Figure 4, Figure 7 is a similar view taken on the line 7—7 of Figure 4, Figure 8 is a plan view of an undirectional auxiliary transmission mechanism, Figure 9 is a side elevational view of the assembled drive structure, Figure 10 is a fragmentary plan view of a modified auxiliary drive structure, Figure 11 is a transverse section taken on the line 11—11 of Figure 6, Figure 12 is a similar view taken on the line 12—12 of Figure 6, and Figure 13 is an enlarged transverse section taken on the line 13—13 of Figure 9.

The drive mechanism is preferably mounted on a trailer truck or a coach truck 20 forming a part of the locomotive construction, said truck being equipped with the conventional wheel axle 21 attached to and rotating with carrier wheels 22.

A main drive gear of the transmission, generally indicated at 23, is attached to the axle, said gear being formed with axially projecting hub portions 24 and having teeth of the spur type 25 formed at the periphery. The outer ends of the hub portions 24 are reduced in diameter, as indicated at 26, the purpose of which will be later described. This drive gear 23 is split diametrically and connected in assembly by means of transverse bolts 27.

Entirely enclosing the drive gear 23 in its position on the axle, is a housing, indicated in its entirety at 28, formed to snugly enclose the main drive gear and assuming a transverse position on the truck axle 21. At the rear end, the housing is constructed to provide a plurality of gear compartments and is formed with a radially extending arm 29 disposed to project horizontally when in operative position. The housing 28 is divided in a transverse axial plane to form an upper and a lower housing section 30 and 31, respectively.

Secured in the side openings of the housing are annular bearing rings 32 provided with outwardly directed flanges engaging shoulders in the casing to prevent displacement thereof. The inner periphery of each ring 32 is formed to snugly engage the reduced portions 26 of the gear hub to provide a replaceable journal construction. Disposed about the axle 21 and positioned against the outer surface of the hub and bearing rings 32 are annular packing rings 33, preferably formed of suitable yieldable packing material. The packing rings 33 are held in position by means of exterior rigid retaining rings 34 positioned about the axle and attached to the hub by screws 35 thus forming a substantially oil tight packing arrangement.

Mounted in a vertical position in the offset structure of the housing is a spur pinion 36 arranged to mesh with the main drive gear 25 and fixed upon a transverse supporting spindle 37. The spindle 37 is supported in ball bearings 38 and is formed with lateral extensions projecting transversely through the side compartments 39 in the forward extension of the housing, while the pinion 36 is disposed in a central compartment 40.

Each of the lateral extensions of the pinion spindle 37 is disposed to drive one or more auxiliary transmission mechanisms. One of the lateral extensions carries a worm 41 disposed to mesh with a worm gear 42 journaled for horizontal rotary movement upon a vertical spindle 43. The spindle 43 is formed with a central lubricating passage enlarged at the upper end to form a coupling socket 44 and having a transverse pin 45 fixed in an offset position therein.

The opposed lateral extension of the pinion spindle, carries an annular ring 46 rigidly secured thereon and provided with a pair of transverse slots formed to engage a pair of axially extending slidable keys 47. At each side of the ring 46 are mounted freely rotatable complementary bevel gears 48 formed with inwardly projecting hubs provided with angular notches 49. The notches are shaped to receive arcuate tapered hooks 50 disposed at each end of the keys 47 and curved in opposed directions, the keys being formed to engage one or the other of the spaced bevel gears 48.

The complementary gears 48 are mounted to mesh with a horizontally rotatable gear 51 supported on a stub spindle 52 and formed with bevel and conventional spur gear. The gear 51 in turn meshes with a horizontally rotating spur gear 53 fixed to a vertical rotary shaft 54 formed with a central oil passage and provided with a coupling socket 55 at its upper end.

Thus, the worm transmission is particularly adapted for the operation of a speedometer, generally indicated at 56, and preferably driven through the instrumentality of a reversible flexible drive shaft 57, such as the speed indicating device described in my copending application above identified. The opposed auxiliary shaft 54 may be coupled with a flexible drive shaft of an electric generator, designated at 58, or other auxiliary mechanism requiring a uni-directional operating mechanism.

As shown to advantage in Figure 4, the sides of the housing extension are formed with threaded apertures disposed in alignment with the spindle shaft 37 and, where a double drive is required, carry threaded plugs 59. When, however, it is desirable to operate additional auxiliary equipment, such as a dynamometer or the like, an additional transmission may be provided by connection with the ends of the spindle 37, as shown to advantage in Figure 10.

The ends of each flexible drive shaft extending from the auxiliary instrumentalities are formed with a reduced extension 60 disposed to be slidably fitted in the sockets of the auxiliary transmission spindles to provide a positive coupling which could be automatically disconnected in the event of accident, thereby materially reducing the damage to the drive mechanism. The coupling connection with the spindle 43 would provide a reverse rotary drive adaptable for speedometers embodying reverse drive shafts while the spindle 54 would be connected with a uni-directional drive shaft operating a generator or similar mechanism.

The housing supporting the main drive gear 23 is preferably suspended from a resilient support designed to relieve the axle of the entire weight of the housing. This support preferably embodies an eye bolt 61 threaded in a boss formed on the housing and a coiled tension spring 62 having its lower end connected to the eye bolt and its upper end connected with a portion of the truck frame. Thus, the spring 62 is designed to resiliently support the housing and relieve the direct pressure upon the truck axle 21 and upon the bearing rings 32 so as to reduce to a minimum distorted wear of these rings.

The outer free end of the arm 29 extending in a substantially radial position from the main housing structure in a horizontal position is also resiliently supported. This arm support embodies a metallic bracket 63 having the upper portion 64 bent in angular form and positioned over a cross bar of the truck frame and riveted thereto. The lower portion of this bracket is of channel, substantially U-shaped form provided with transversely elongated, directly opposed slots 65 in the vertical flanges thereof. The end portion of the arm 29 projects through the slots 65 and engages a vertical guide pin 66 secured in the bracket and projecting through an aperture in the arm. Positioned about the pin 66, above and below the arm, are coiled compression springs 67 designed to cushion vibratory movement of the arm.

When mounted in operative position, the housing will be supported in such manner as to reduce vibration and obviate shocks incidental to the movement of the carrying truck thereby permitting proper operation of the flexible transmission shafts under all road conditions and substantially prolonging the operative life of the mechanism. Furthermore, the auxiliary instrumentalities will be driven positively and with the utmost accuracy for efficient operation of the equipment and reliable registration of the speed indicating and recording mechanisms. The main and auxiliary drive gearing will be properly and constantly lubricated by the continuous introduction of lubricant into the housing through the flexible drive connection with the speedometer for the co-operation of which the drive structure is particularly designed.

It is to be understood that the form of my invention herein shown and described is to be taken as a preferred example of the same, and that various changes as to the shape, size, and arrangement of parts may be resorted to without departing from the spirit of the invention or the scope of the subjoined claims.

Having thus described my invention, I claim:

1. In a drive mechanism for railway apparatus, the combination with a rotary axle, of a toothed drive gear secured on said axle, a toothed pinion journaled adjacent said drive gear and meshing therewith, and a plurality of auxiliary transmission drive mechanisms connected with the pinion adapted to drive the shafts of auxiliary apparatus in reversible rotary movement and in uni-directional rotary movement.

2. In a drive mechanism, the combination of a main toothed drive gear adapted to be secured upon the rotary axle of a truck, a housing enclosing said drive gear, an arm provided at one end of said housing, a toothed pinion journaled in an extension of the housing and meshing with the drive gear, a pair of auxiliary transmission gear sets driven by said pinion, clutch means co-operating with the pinion to drive one of the auxiliary gear sets in unidirectional movement regardless of the movement of the truck, and spring means oppositely urging the arm of the housing to resiliently support the same.

3. In a drive mechanism for auxiliary railway equipment, the combination with a rotary shaft, of a toothed drive gear secured about the shaft to rotate therewith, a housing enclosing said gear and journaled on the hub thereof, a toothed pinion journaled in an extension of the housing in mesh with the drive gear, rotatable spindles mounted in the housing adapted for connection with the shafts of auxiliary apparatus, auxiliary transmission gearing disposed between said spindles and the pinion whereby the spindles will be rotated simultaneously with the rotation of the pinion, and means for resiliently supporting the housing to absorb vibration and shocks incidental to the movement of the truck or axle.

4. In a drive mechanism, the combination with a rotary truck axle, of a spur gear secured about the axle and rotatable therewith, a housing formed to enclose the gear and journaled on the hub thereof, said housing being provided with a horizontally extending arm, a transverse shaft rotatably mounted in an extension of the housing, a pinion fixed on said transverse shaft and meshing with the drive gear, a plurality of auxiliary drive spindles journaled in the housing adapted for connection with the drive shafts of auxiliary equipments, auxiliary transmission gearing connected with the spindles and with the pinion shaft for simultaneous operation thereof, spring means supporting the outer end of the casing arm and other spring means relieving the axle for undue weight.

In witness whereof I have hereunto set my hand.

ARMAND JUNEAU.